(12) United States Patent
Weiss et al.

(10) Patent No.: US 10,521,247 B2
(45) Date of Patent: Dec. 31, 2019

(54) DYNAMIC RELOCATION OF GRAPHICAL DIGITAL CONTENT

(71) Applicant: AppNexus Inc., New York, NY (US)

(72) Inventors: Jeffrey Weiss, Chatsworth, CA (US);
Vikki Pitts, Northridge, CA (US);
Alexander Krassel, Encino, CA (US);
Radhika Shivapurkar, Woodlands Hills, CA (US); Kyungsuk Song, Encino, CA (US)

(73) Assignee: XANDR INC., New York, NY (US)

(*) Notice: Subject to any disclaimer, the term of this patent is extended or adjusted under 35 U.S.C. 154(b) by 11 days.

(21) Appl. No.: 15/358,587

(22) Filed: Nov. 22, 2016

(65) Prior Publication Data
US 2018/0143842 A1 May 24, 2018

(51) Int. Cl.
| | |
|---|---|
| G06F 9/44 | (2018.01) |
| G09G 5/38 | (2006.01) |
| G09G 5/373 | (2006.01) |
| G09G 5/377 | (2006.01) |
| G06F 17/21 | (2006.01) |
| G06F 9/451 | (2018.01) |
| G06F 3/0485 | (2013.01) |
| G06F 17/22 | (2006.01) |

(Continued)

(52) U.S. Cl.
CPC ........... G06F 9/451 (2018.02); G06F 3/0485 (2013.01); G06F 17/212 (2013.01); G06F 17/2229 (2013.01); G09G 5/00 (2013.01); G09G 5/373 (2013.01); G09G 5/377 (2013.01); G09G 5/38 (2013.01); G09G 5/34 (2013.01); G09G 2340/045 (2013.01); G09G 2340/0407 (2013.01); G09G 2340/0464 (2013.01); G09G 2340/12 (2013.01); G09G 2340/145 (2013.01); G09G 2354/00 (2013.01)

(58) Field of Classification Search
None
See application file for complete search history.

(56) References Cited

U.S. PATENT DOCUMENTS

| | | | |
|---|---|---|---|
| 2005/0084136 A1* | 4/2005 | Xie | G06F 17/30905 382/107 |
| 2009/0244003 A1* | 10/2009 | Bonnat | G06F 3/011 345/157 |
| 2015/0130705 A1* | 5/2015 | Im | G06F 3/013 345/156 |

OTHER PUBLICATIONS

<http://www.cnn.com/videos/world/2015/12/05/climate-chang e-conference-cop21-brazil-rio-de-janeiro-qmb.cnn>. Video Functionality, Last viewed Jan. 25, 2017.

(Continued)

*Primary Examiner* — Edward Martello
(74) *Attorney, Agent, or Firm* — Guntin & Gust, PLC; Andrew Raymond (57) ABSTRACT

Techniques are disclosed for advantageously relocating graphical digital content on a screen of a client device. The technique can include displaying a dynamic content at a particular location on the screen of a client device (e.g., inline with an article displayed on a webpage). Upon determination that a relocation condition exists (e.g., a viewability of the inline dynamic content drops below a particular threshold), the dynamic content can be relocated to another location on the screen. In some instances, rather than being relocated to a static, previously determined position, the dynamic content can be dynamically relocated, based on the location of the other content.

20 Claims, 5 Drawing Sheets

(51) Int. Cl.
*G09G 5/00* (2006.01)
*G09G 5/34* (2006.01)

(56) References Cited

OTHER PUBLICATIONS

The AppNexus Impressionist, The State of Our Unified Platform is Strong, <http://video-demo.appnexus.com/samples/stickyfollow.html>, blog posted on Sep. 24, 2015, video player embedded on Jun. 9, 2016.

* cited by examiner

DYNAMIC RELOCATION OF GRAPHICAL DIGITAL CONTENT

TECHNICAL FIELD

This specification relates to the presentation of graphical digital content to a user on a screen of a client device and, more particularly, to dynamically relocating certain graphical digital content in certain circumstances.

BACKGROUND

Digitally produced content is ubiquitous in today's society. In many instances, printed newspapers and books have been replaced with digital content mediums such as computers, tablets, and mobile phones. In many ways, the transition to digital has improved the presentation of content. For example, users can easily access content from myriad sources from a single device via the internet. In addition, content that could not be presented in static print mediums, such as video content, can now be presented on personal devices. Users can also interact with the content in ways not possible with static print content, e.g., via touch screens and other input devices.

However, along with the benefits provided by digital content comes new challenges, as well. For example, the screens on which digital content is presented are of finite space, in some instances (e.g., mobile phones) much smaller than the space on a book or newspaper page. This often requires that the content be presented in a scrollable or other navigable format, such that a user has the freedom to determine what portion of the content in displayed on the screen. This freedom to scroll or navigate often results in users scrolling or navigating past certain content that the content producer deems particularly important and wants to continue displaying to user.

As one example, a news content publisher may publish an article that has an associated video with a correspondent providing commentary that the publisher considers particularly relevant. In many conventional systems, the video content will only be configured to play if the window containing the video content is adequately presented on the client device screen. Thus, once a user scrolls past the video content window (a common occurrence, e.g., when a user jumps straight to the article text) the video is not presented to the user. This can be a negative result for content publishers that wish to display the video to their viewers.

Accordingly, a need exists for an improved method for presenting digital content to users, such that content publishers can ensure that viewers actually view the desired content.

SUMMARY

This specification describes an improved technique for presenting digital content to viewers. The technique can include dynamically relocating content such that it is presented to a user for an amount of time desired by the content publisher. Certain implementations of the subject matter described herein can realize the advantage of providing content publishers greater control over how and when particular types of content are viewed by their viewers.

In general, one aspect of the subject matter described in this specification can be embodied in methods for dynamically relocating a dynamic content displayed in a graphical user interface. The method can include the actions of displaying the dynamic content at a first location within a graphical user interface on a screen of a client device; determining that a relocation condition exists; identifying a location of other content displayed on the graphical user interface; and dynamically identifying a second location within the graphical user interface to relocate the dynamic content to, where the second location is identified based on the location of the other content. Other embodiments of this aspect include corresponding systems, apparatus, and computer programs.

These and other aspects can optionally include one or more of the following features. In some cases, the method can further include the step of relocating the dynamic content to the second location. The method can further include the step of resizing the dynamic content to fit in the second location. The method can further include the steps of determining that the relocation condition no longer exists, and relocating the dynamic content back to the first location. In other cases, the method can include determining a size of the dynamic content if the dynamic content is relocated to the second location, and, if (i) the size is below a predetermined minimum size and/or (ii) the size will cover a predetermined maximum percentage of the screen of the client device, then deciding to not relocate the dynamic content to the second location.

In some implementations, the relocation condition can include a viewability of the dynamic content being below a predetermined threshold. The dynamic content can include a video player playing video content. In some cases, identifying the second location can include identifying a location at which the dynamic content will (i) overlap an acceptable amount (e.g., no overlap) with the other content and/or (ii) be located an acceptable distance from the other content. In some cases, the second location can be located at a side portion of the screen of the client device. In some such cases, the first location can be located inline with a scrollable content. In some such cases, when the dynamic content is located at the second location, the dynamic content can remain in view as a user scrolls the scrollable content. The client device can include at least one of a desktop computer, a laptop computer, and a mobile computing device.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

In various implementations, the description provided herein relates to an improved technique for relocating graphical digital content within a graphical user interface on a screen of a client device.

Figure 1:
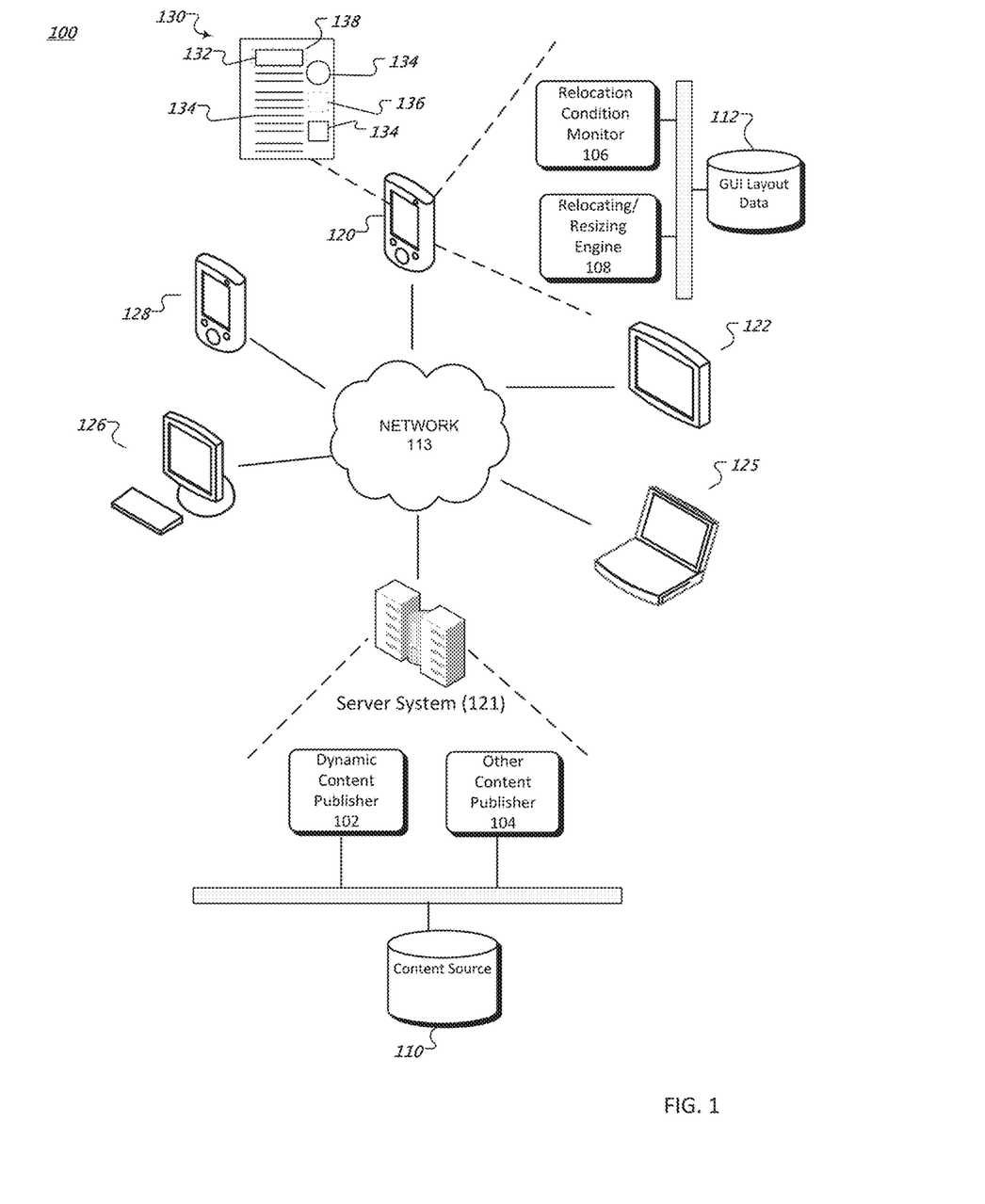
FIG. 1 is a schematic diagram of a content distribution and display system used in certain implementations.

FIG. 1 illustrates an example content distribution and display system 100. The system 100 comprises hardware components, software components and databases that can be deployed at one or more data centers in one or more geographic locations, for example. In some instances, certain components are hosted on third-party servers. One or more client devices (e.g., client devices 120, 122, 125, 126 and 128) such as laptop computers, smart phones, tablet computers or desktop computers make requests and receive responses from a server system 121 through network 113. The network 113 can be one or more public or private data communication networks such as the Internet, for example. The communication protocol used by the client devices to communicate with the server system 121 can be HTTP (Hypertext Transfer Protocol) or any other suitable protocol.

In various implementations, each client device includes a graphical user interface ("GUI") 130 that displays content to a user. The GUI 130 can be implemented as a web page or as a stand-alone application that execute atop operating system software on the client devices. The GUI 130 can generally be engaged by any user interacting with digital internet-based content, e.g., reading a news article, playing a game, etc.

In various implementations, the server system 121 components comprise a dynamic content publisher 102 and/or an other content publisher 104. The client devices 120, 122, 125, 126 and 128 components can comprise a relocation condition monitor 106 and/or a relocating engine 108. The software components can comprise subcomponents that can execute on the same or on different individual data processing apparatus. The software components can also use content and/or data drawn from a variety of sources. As some non-limiting example, the server system 121 can include and/or have access to a content source 110, and the client devices 120, 122, 125, 126 and 128 can include and/or have access to a GUI layout data database 112, each of which are described in more detail below. The databases can reside in one or more physical storage systems and can be implemented as relational databases, flat files, object-oriented databases, or combinations of these.

As mentioned above, this disclosure relates to the dynamic relocation of dynamic content. In order to better understand the disclosure, it is helpful to establish a vocabulary for certain terms, as they are used herein. The GUI 130 can present several types of content to a user. For example, text, video streams, banners, advertisements, etc. Content is often located in a content window, which can have varying sizes and configurations depending on the particular GUI. This disclosure refers primarily to two categories of content: dynamic content 132 and other content 134.

In general, dynamic content 132 includes any content that is relocated within the GUI 130 based on the existence of a relocation condition, described in detail below. For the sake of providing illustrative examples, dynamic content 132 will generally be described as video content in this disclosure. However, it is contemplated that in other implementations, dynamic content 132 can be any other known content type (e.g., text, jpeg, mpeg, etc.) Conversely, other content 134, as used herein, refers to any other content presented in the GUI 130, that is not relocated based on the existence of a relocation condition. For example, the other content 134 can be the text of an article, a sidebar advertisement, a banner advertisement, a static video stream, etc.

In various implementations, the dynamic content publisher 102 and/or other content publisher 104 of server system 121 can acquire content from content source 110 and deliver it to the client devices 120, 122, 125, 126, and 128 via network 113. In some implementations, dynamic content 132 and other content 134 can be published from the same publisher. For example, a single publisher may publish multiple pieces of content for a particular GUI 130, some of which the publisher wants to relocate upon existence of a relocation condition (i.e., dynamic content 132), and some of which the publisher wants to remain static upon existence of a relocation condition (i.e., other content 134). One example of this circumstance can be the example provided above of a news content publisher that considers a video accompanying a text article to be particularly relevant, such that the publisher wants the video to remain visible even if a user scrolls past it while reading the article. In this instance, the news publisher publishes both dynamic content 132 (the video) and other content 134 (the article text).

In other implementations, the publisher may only publish dynamic content 132. In such instances, the publisher's server may only include a dynamic content publisher 102 and not an other content publisher 104. As one example, the publisher can be an advertisement ("ad") publisher that serves ads into ad content windows within GUIs published by primary content publishers. Primary content publishes often get paid based on the visibility of the ads displayed on their websites. As such, they may configure their GUIs to accept dynamic content 132 from an ad publisher to ensure that the dynamic content 132 (ads) remains visible, as described in more detail below.

In various implementations, client devices 120, 122, 125, 126, and 128 can include a relocation condition monitor 106. The relocation condition monitor 106 monitors the presentation of GUI 130 and determines when a relocation condition exists. In general, a relocation condition can be any condition in which it is desirable to relocate the dynamic content 132 from its original position. For example, the relocation condition can be that a viewability of the dynamic content 132 has dropped below a threshold value (e.g., the user has scrolled past the dynamic content 132, another window/browser is blocking the dynamic content 132, etc.). The threshold value can be any desired value; for example, 80%, 70%, 60%, 50%, 40%, 30%, 20%, 10%, etc. Another relocation condition can be if the dynamic content 132 has been presented on the GUI 130 for a threshold amount of time (e.g., the theory being that a user may be looking at a different section of the screen after a certain amount of time). Many other relocation conditions are possible.

In various implementations, once a relocation condition is detected, a relocating/resizing engine 108 can relocate the dynamic content 132 to a different position within the GUI 130. Taking the example of the relocation condition being a reduced viewability, the different position on the page can present the dynamic content 132 with an increased viewability, for example. In some instances, the dynamic content 132 can be relocated to a predetermined static position on the screen of the client device 120 (e.g., the bottom right corner of the screen). In other instances, the relocating/resizing engine 108 can dynamically relocate the dynamic content 132 based on the location of other content 134 displayed on the page. The relocating/resizing engine 108 can access the GUI layout data database 112 to determine the position of other content 134 and, based on the GUI layout data, can identify a location within the GUI 130 to relocate the dynamic content 132 to, as described in more detail below. In either instance, once the dynamic content 132 is relocated it can remain in view on the screen as a user scrolls.

Figure 2A:
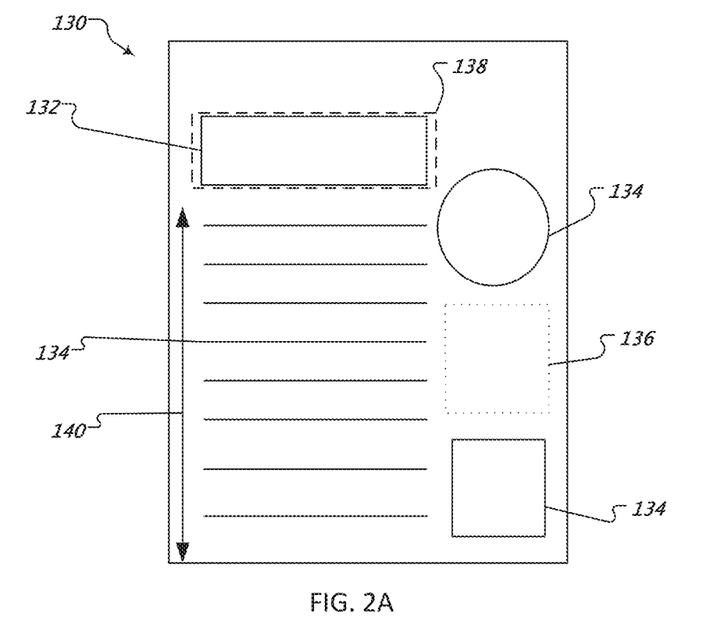
FIG. 2A is an example schematic depiction of a screen displaying digital content with a dynamic content in a first location.
Figure 2B:
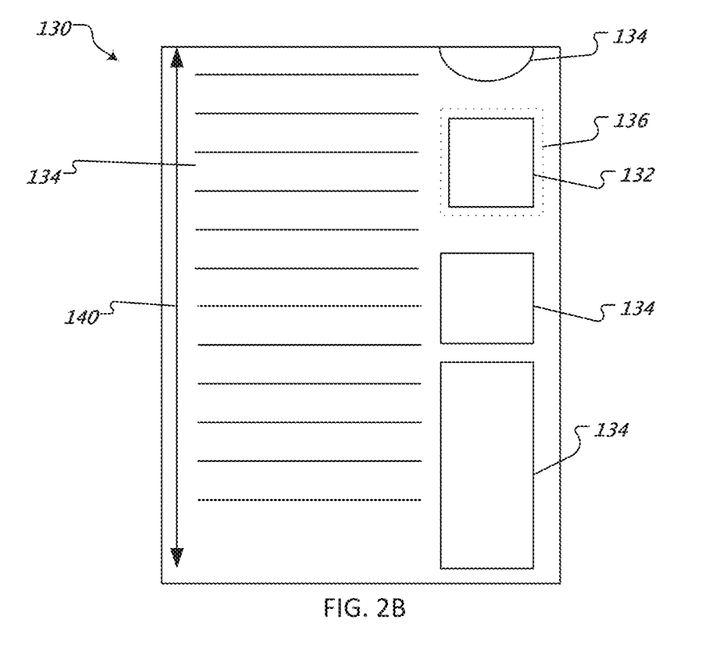
FIG. 2B is an example schematic depiction of a screen displaying digital content with the dynamic content from FIG. 2A in a second location.

The above-described concept is further illustrated in FIGS. 2A-2B and 3A-3B. FIG. 2A depicts an example screen displaying digital content within GUI 130, with dynamic content 132 located in an original (first) position 138. As shown, the GUI 130 also includes a number of other content 134 items. Arrow 140 indicates that the GUI 130 is scrollable. FIG. 2B depicts GUI 130 after it has been scrolled enough by a user such that the original location 138 of the dynamic content 132 is no longer visible, which in this example results in the occurrence of a relocation condition. As a result, the relocating/resizing engine 108 can relocate the dynamic content 132 to a different (second) location 136 such that it remains visible to the user. As shown in FIG. 2B, in some cases, the second location 136 has a different size than the first location 138. In such cases, the relocating/resizing engine 108 can resize the dynamic content 132 so that it fits into the second location 136, using a variety of known techniques. In some instances, if the relocation condition ceases to exist (e.g., if a user scrolled the GUI 130 back such that the dynamic content 132 would have a viewability above the threshold if located in the original location 138), then the dynamic content can be relocated back from the second position 136 to the first position 138. In other instances, once the dynamic content 132 is relocated to the second position 136, it is not relocated back to the first position 138, even if the relocation condition ceases to exist.

In some implementations, GUI 130 can be designed to include second location 136. For example, this may occur in circumstances in which the publisher has knowledge that an important dynamic content 132 (e.g., a content for which the publishers wants to remain visible) will be placed in the original location 138. However, in many implementations, GUI 130 will not be designed with the second location 136 in mind. In such implementations, the relocating/resizing engine 108 can dynamically relocate the dynamic content 132 based on the locations of the other content 134. The relocating/resizing engine 108 can determine the location of the other content displayed on the GUI 130 using GUI layout data provided from database 112 and, using this information, can identify where space exists for the second location 136. This can be advantageous, for example, in circumstances in which the dynamic content publisher does not have control over (or prior knowledge of) the GUI layout. For example, this may be the case when the dynamic content publisher is different than the other content publisher (e.g., if the dynamic content publisher is an ad server).

In various implementations, the identification of the second location 136 is governed by certain rules. In some cases, a rule can be that the dynamic content 132 must meet a viewability threshold (e.g., 70%, 80%, 90%, 100%, etc.). In some cases, a rule can be that the dynamic content 132 overlaps an acceptable amount with any other content 134 (e.g., less than 30% of the other content 134, less than 20% of the other content 134, less than 10% of the other content 134, 0% (no overlap with the other content 134), etc.) In some cases, a rule can be that the dynamic content 132 is located an acceptable distance from any other content 134. For example, the dynamic content 132 is located at least 1 mm, 2 mm, 3 mm, and/or 5 mm from any other content 134, according to various embodiments. In some cases, a rule can be that the dynamic content 132 is located in a certain section of the GUI 130 (e.g., a side portion, a banner, not inline with text content, etc.). Many other rules governing the identification of the second location 136 are possible. In some implementations, if no second location 136 is identified that satisfies all of the governing rules, then the relocating/resizing engine 108 can decide to not relocate the dynamic content 132.

Figure 3A:
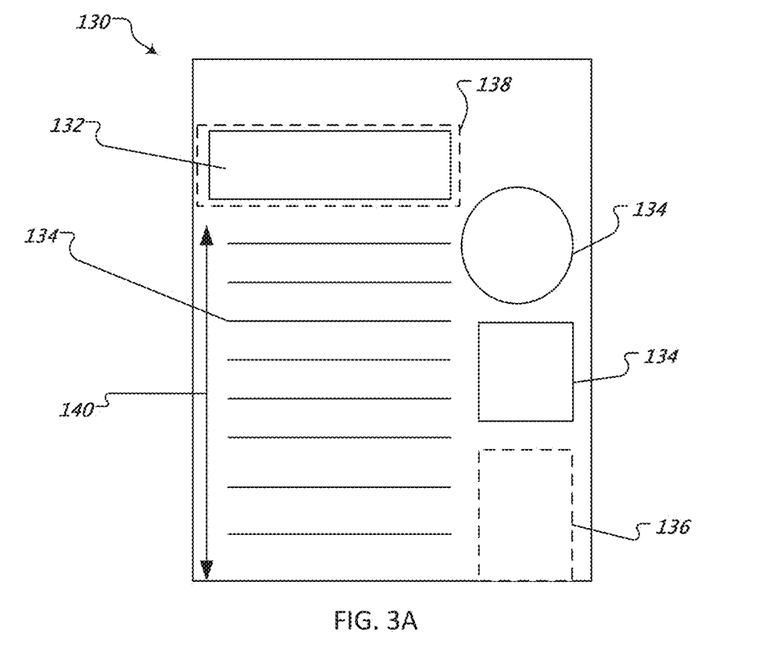
FIG. 3A is an example schematic depiction of a screen displaying digital content having a different layout than FIGS. 2A-B, with a dynamic content in a first location.
Figure 3B:
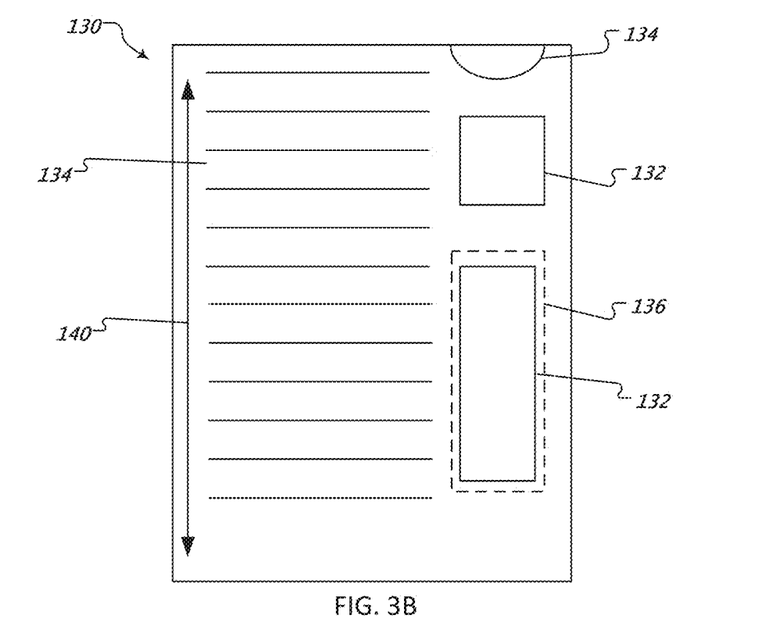
FIG. 3B is an example schematic depiction of a screen displaying digital content having a different layout than FIGS. 2A-B, with the dynamic content from FIG. 3A in a second location.

By way of example, the dynamic relocation of dynamic content 132 is illustrated with an inspection of FIGS. 2A-B versus FIGS. 3A-B. As shown, the GUI 130 in FIGS. 2A-B has a different layout from the GUI 130 in FIGS. 3A-B. In FIGS. 2A-B, the side portion of the GUI 130 has a circular-shaped content, followed by a square-shaped space, followed by a square-shaped content, followed by a rectangular-shaped content. Conversely, in FIGS. 3A-B, the side portion of the GUI 130 has a circular-shaped content, followed by a square-shaped content, followed by a rectangular-shaped space. In some implementations, dynamic relocation of dynamic content 132 means that dynamic content 132 can be relocated into the available open space, e.g., into the square-shaped space 136 in FIGS. 2A-B and the rectangular-shaped space 136 in FIGS. 3A-B, based upon an analysis of the GUI layout data by relocating/resizing engine 108. This is different than a non-dynamic relocation, in which dynamic content 132 is relocated to another location (e.g., a bottom right corner of the screen) without regard for the location of other content 134 in the GUI 130.

As shown in FIGS. 2A-B and FIGS. 3A-B, the size and shape of the identified second location 136 differ depending on the GUI layout (e.g., square vs. rectangle). As mentioned, in some instances, the dynamic content 132 can be resized to fit in the identified second location 136. In various implementations, certain rules can govern the resizing of the dynamic content 132. In some cases, a rule can be that the resized dynamic content 132 cannot have a size below a certain minimum size. The minimum size can be set based on a viewability of the resized dynamic content 132. In some cases, a rule can be that the resized dynamic content 132 cannot cover a certain maximum percentage of the screen. The maximum percentage can be, for example, 20%, 30%, 40%, 50%, 60%, 70%, 80%, 90%, etc. In some cases, a rule can be that the resized dynamic content 132 has an aspect ratio that substantially matches an aspect ratio of a primary content displayed on the GUI. Many other rules governing the resizing of the dynamic content 132 are possible. In some implementations, if a size of the resized dynamic content 132 would violate a rule, then the relocating/resizing engine 108 can decide to not relocate the dynamic content 132.

Figure 4:
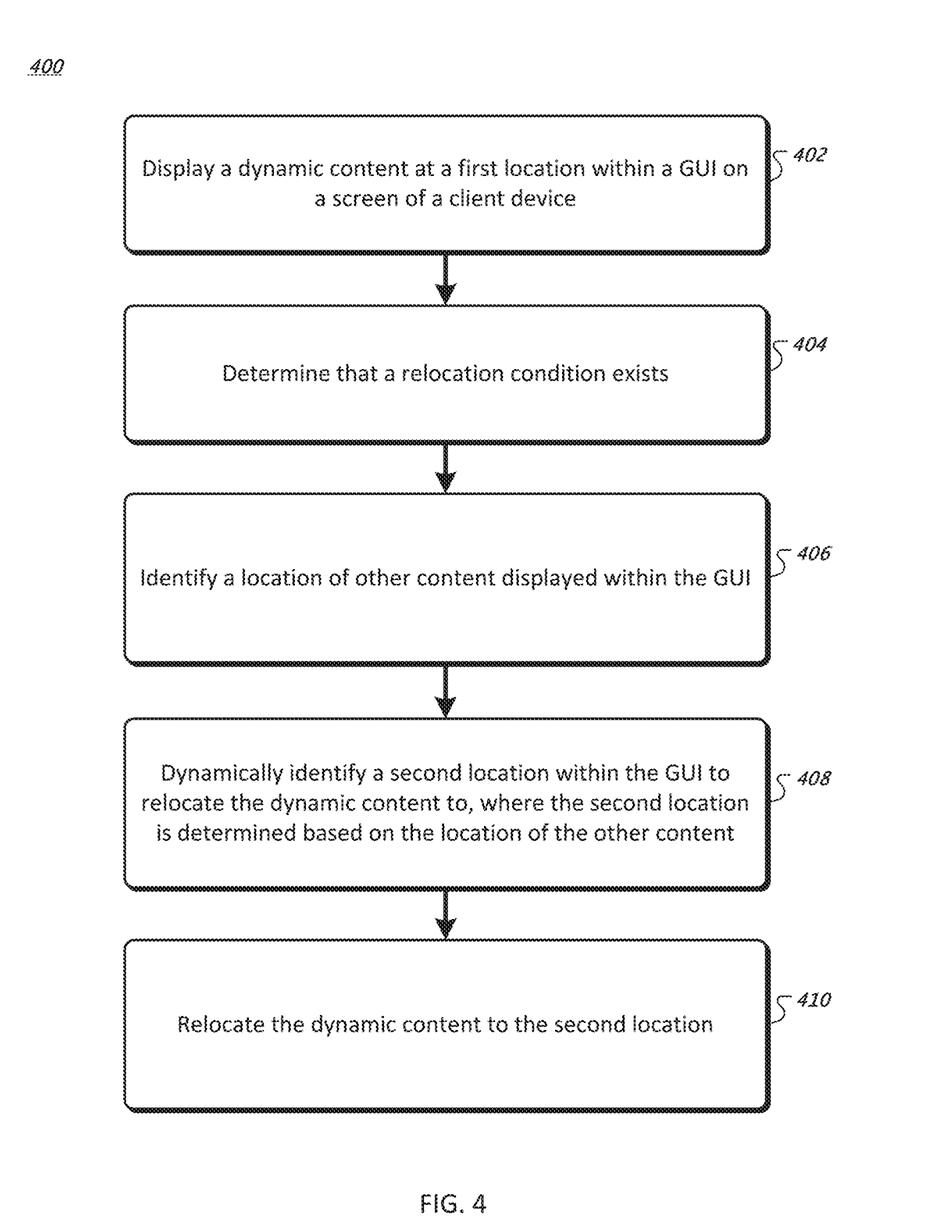
FIG. 4 is a flow chart of an example method for dynamically relocating a dynamic content.

FIG. 4 is a flow chart of an example method 400 for dynamically relocating a dynamic content 132. The method can include displaying a dynamic content 132 at a first location 138 within a GUI 130 on a screen of a client device (402); determining that a relocation condition exists (404); identifying a location of other content 134 displayed within the GUI 130 (406); and dynamically identifying a second location 136 within the GUI 130 to relocate the dynamic content 132 to, where the second location 136 is identified based on the location of the other content (408). In some cases, the method can include relocating the dynamic content 132 to the second location 136 (410).

Operating Apparatus

Figure 5:
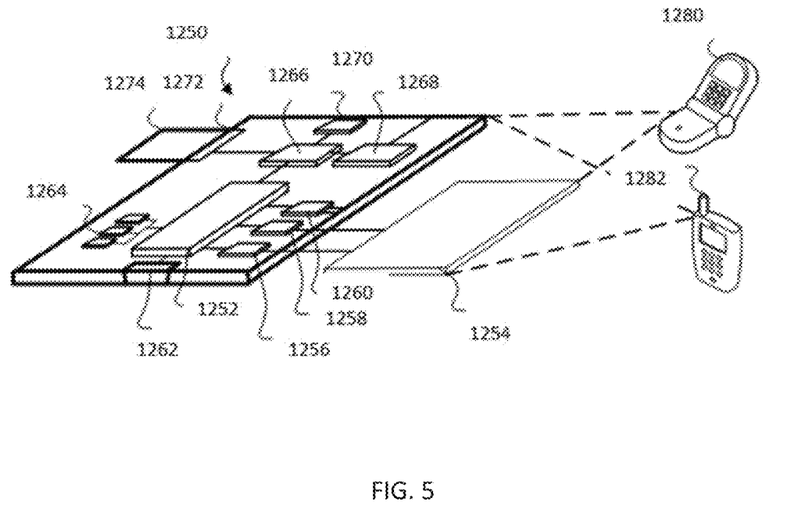
FIG. 5 illustrates an example client device that can be used in certain implementations.

FIG. 5 shows an example of a generic computing device 1250, which may be used with the techniques described in this disclosure. Computing device 550 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provided as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, memory on processor 1252, or a propagated signal that may be received, for example, over transceiver 1268 or external interface 1262.

Device 1250 may communicate wirelessly through communication interface 1266, which may include digital signal processing circuitry where necessary. Communication interface 1266 may in some cases be a cellular modem. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in FIG. 5. For example, it may be implemented as a cellular telephone 1280. It may also be implemented as part of a smartphone 1282, smart watch, personal digital assistant, or other similar mobile device.

Operating Environment

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for dynamically relocating a dynamic content displayed in a graphical user interface, the method comprising:
    displaying, by a computing system including a processor, the dynamic content at a first location within a graphical user interface on a screen of a client device;
    detecting, by the computing system, existence of a relocation condition indicating desirability of relocating the dynamic content;
    identifying, by the computing system, a location of other content displayed on the graphical user interface, wherein the other content comprises content not to be relocated responsive to the existence of the relocation condition;
    dynamically identifying, by the computing system, a second location within the graphical user interface to relocate the dynamic content to, wherein the second location is identified based on the location of the other content;
    relocating, by the computing system, the dynamic content to the second location; and
    responsive to a determination that the relocation condition no longer exists, relocating the dynamic content back to the first location.

2. The method of claim 1, further comprising: resizing the dynamic content to fit in the second location.

3. The method of claim 1, wherein the relocation condition comprises a viewability of the dynamic content being below a predetermined threshold, wherein the viewability represents a percentage of the dynamic content that is visible on the graphical user interface.

4. The method of claim 1, wherein the dynamic content comprises a video player playing video content.

5. The method of claim 1, wherein identifying the second location comprises identifying a location at which the dynamic content will at least one of (i) overlap an acceptable amount with the other content and (ii) be located an acceptable distance from the other content.

6. The method of claim 5, wherein the acceptable amount of overlap comprises no overlap.

7. The method of claim 1, wherein the second location is located at a side portion of the screen of the client device.

8. The method of claim 7, wherein the first location is located inline with a scrollable content.

9. The method of claim 8, wherein when the dynamic content is located at the second location, the dynamic content remains in view as a user scrolls the scrollable content.

10. The method of claim 1, further comprising:
    determining a size of the dynamic content if the dynamic content is relocated to the second location; and
    if at least one of (i) the size is below a predetermined minimum size and (ii) the size will cover a predetermined maximum percentage of the screen of the client device, then deciding to not relocate the dynamic content to the second location.

11. The method of claim 1, wherein the client device comprises at least one of a desktop computer, a laptop computer, and a mobile computing device.

12. A system for dynamically relocating a dynamic content displayed in a graphical user interface, the system comprising:
    a computing system including a processor; and
    a memory that stores executable instructions that, when executed by the computing system, facilitate performance of operations comprising:
        displaying the dynamic content at a first location within a graphical user interface on a screen of a client device;
        detecting existence of a relocation condition indicating desirability of relocating the dynamic content;
        identifying a location of other content displayed on the graphical user interface, wherein the other content comprises content not to be relocated responsive to the existence of the relocation condition;
        dynamically identifying a second location within the graphical user interface to relocate the dynamic content to, wherein the second location is identified based on the location of the other content;
        relocating the dynamic content to the second location; and
        responsive to a determination that the relocation condition no longer exists, relocating the dynamic content back to the first location.

13. The system of claim 12, wherein the operations further comprise: resizing the dynamic content to fit in the second location.

14. The system of claim 12, wherein the relocation condition comprises a viewability of the dynamic content being below a predetermined threshold, wherein the viewability represents a percentage of the dynamic content that is visible on the graphical user interface.

15. The system of claim 12, wherein the dynamic content comprises a video player playing video content.

16. The system of claim 12, wherein identifying the second location comprises identifying a location at which the dynamic content will at least one of (i) overlap an acceptable amount with the other content and (ii) be located an acceptable distance from the other content.

17. The system of claim 12, wherein the first location is located inline with a scrollable content, wherein when the dynamic content is located at the second location, the dynamic content remains in view as a user scrolls the scrollable content.

18. A non-transitory machine-readable medium, comprising executable instructions that, when executed by a computing system including a processor, facilitate performance of operations, comprising:

displaying the dynamic content at a first location within a graphical user interface on a screen of a client device;

detecting existence of a relocation condition indicating desirability of relocating the dynamic content;

identifying a location of other content displayed on the graphical user interface, wherein the other content comprises content not to be relocated responsive to the existence of the relocation condition;

dynamically identifying a second location within the graphical user interface to relocate the dynamic content to, wherein the second location is identified based on the location of the other content;

relocating the dynamic content to the second location; and responsive to a determination that the relocation condition no longer exists, relocating the dynamic content back to the first location.

19. The non-transitory machine-readable medium of claim 18, wherein the operations further comprise resizing the dynamic content to fit in the second location.

20. The non-transitory machine-readable medium of claim 18, wherein the relocation condition comprises a viewability of the dynamic content being below a predetermined threshold, wherein the viewability represents a percentage of the dynamic content that is visible on the graphical user interface.

* * * * *